Figure 1:
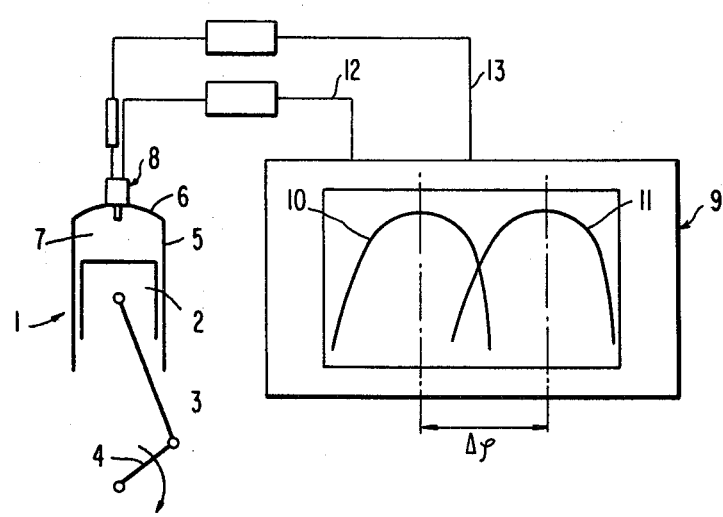

United States Patent [19]
Hohenberg et al.

[11] 4,147,054
[45] Apr. 3, 1979

[54] METHOD AND APPARATUS FOR DETERMINING THE UPPER DEAD-CENTER POSITION WITH PISTON ENGINES

[75] Inventors: Günter Hohenberg, Hohengehren; Detlef Kurr, Waiblingen, both of Fed. Rep. of Germany

[73] Assignee: Daimler-Benz Aktiengesellschaft, Fed. Rep. of Germany

[21] Appl. No.: 856,977

[22] Filed: Dec. 2, 1977

[30] Foreign Application Priority Data

Dec. 4, 1976 [DE] Fed. Rep. of Germany ....... 2655064

[51] Int. Cl.² ............................................. G01M 15/00
[52] U.S. Cl. .................................................... 73/117.3
[58] Field of Search .................. 73/116, 117.3, 119 R, 73/115, 714

[56] References Cited

U.S. PATENT DOCUMENTS

2,072,984  3/1937  Haskins ............................... 73/116 X

FOREIGN PATENT DOCUMENTS

274429  5/1971  U.S.S.R. .................................... 73/115

*Primary Examiner*—Jerry W. Myracle
*Attorney, Agent, or Firm*—Craig & Antonelli

[57] ABSTRACT

A method and apparatus for determining the upper dead-center position in piston engines, in which the crankshaft angle corresponding to the maximum compression pressure is determined by a pressure measurement and by the addition of a correcting factor that corresponds to the thermodynamic loss angle conditioned by heat-transfer and leakage losses.

19 Claims, 2 Drawing Figures

METHOD AND APPARATUS FOR DETERMINING THE UPPER DEAD-CENTER POSITION WITH PISTON ENGINES

The present invention relates to a method for the determination of the upper dead-center position in piston engines, especially in piston internal combustion engines, as well as to an apparatus for carrying out the method.

With externally driven, ideal piston engines, i.e., piston engines free of losses, the pressure development in the cylinder is dependent only on the volume change. Correspondingly, the volume minimum, the upper dead-center position of the piston, and the pressure maximum would occur therein at the same time. However, with real engines, a displacement of the pressure maximum with respect to the upper dead-center position of the piston—piston position OT—results from losses conditioned by the engine. Consequently, with real engines no exact determination of the upper dead-center position is possible according to the present state of the art by way of a simple pressure measurement.

Since, however, with modern engines, an ever-greater significance is attributed to the accurate adjustment of the ignition instant, yet this adjustment can be measured accurately only in relation to a dead-center position of the piston, a great interest exists in practice already for that reason in a simple method for the accurate and rapid determination of the upper dead-center position.

The present invention is concerned with the task to indicate a method for the determination of the upper dead-center position in piston engines, especially in piston internal combustion engines, as well as an apparatus for carrying out the method.

The method according to the present invention for determining the upper dead-center position is characterized by the determination of the crank angle corresponding to the maximum compression pressure using a pressure measurement and by the addition of a correction factor which corresponds to the thermodynamic loss angle conditioned on heat-transfer losses and leakage losses.

The thermodynamic loss angle is thereby determinable according to the present invention by the addition of the heat-transfer loss angle $\Delta \phi_W$ and of the leakage loss ange $\Delta \phi_L$, whereby the values for the heat-transfer loss angle and leakage loss angle can be determined from the following equations:

$$\Delta \phi_W = \frac{\Delta Q}{p_{max} \left[ \frac{C_p}{R} \right] K_1} \quad (1)$$

and $$\Delta \phi_L = \frac{1.924 \cdot \sqrt{T} \cdot A_L}{n_M \cdot K_1} \quad (2)$$

if $\Delta Q$ is the heat quantity off per degree crank angle by the gas to the combustion space wall,
$p_{max}$ is the maximum pressure,
$[C_p/R]$ is the combustion value of the gas,
$K_1$ is a volume function,
T is the gas temperature in °K.,
$A_L$ is the effective leakage cross section, and
$n_M$ is the engine rotational speed,
and if $K_1$ is determined by the following equation:

$$K_1 = 3.05 \cdot 10^4 \cdot V_H \left[ \frac{1}{2} + \lambda \right] \quad (3)$$

in which
$V_H$ is the stroke volume of the cylinder and
$\lambda$ is the connecting-rod ratio.

Within the scope of the solution according to the present invention, the thermodynamic loss angle can, of course, be also determined from the measured displacement between pressure maximum and piston position in the upper dead-center position. The distance measurement necessary for the determination of the piston position in the upper dead-center position and the pressure measurement necessary for the determination of the pressure maximum may be carried out thereby simultaneously within the scope of the present invention. The simultaneous measurement for carrying out the method according to the present invention is thereby adapted to be realized according to the present invention preferably by means of an apparatus, in which the pressure transducer and the distance transducer form a combined assembly or mounting unit so that it is possible to pick-up the responsive values in a customary piston internal combustion engine by way of already present bores, thus, for example, by way of the spark plug bore or the injection nozzle bore.

A quartz pressure transducer or a strain gauge transducer may thereby be preferably provided as pressure-measuring transmitter. A capacitive distance-measuring transmitter of conventional construction may thereby be appropriate as distance transmitter. However, also inductive distance-measuring transmitters of conventional construction may be used within the scope of the present invention as distance-measuring transmitters.

If the pressure-measuring transmitter and the distance-measuring transmitter are combined into a single assembly or mounting unit, then this unit is appropriately provided adjoining its screw-in thread with a pressure-connecting bore coordinated to the pressure transducer and disposed transversely to the thread axis. The part axially disposed between the distance-measuring transmitter cap or dome and the pressure-connecting bore may then appropriately be constructed as an insulating body so that the necessary large insulating paths are assured.

Accordingly, it is an object of the present invention to provide a method and apparatus for determining the upper dead-center position in piston engines which avoids by simple means the shortcomings and drawbacks encountered in the prior art.

Another object of the present invention resides in a method and apparatus for the determination of the upper dead-center position in piston engines, especially in internal combustion engines which is simple in construction, accurate in performance and easy in use.

A further object of the present invention resides in a method and apparatus for determining the upper dead-center position in piston engines which is not only simple but leads to an accurate and rapid determination of the actual upper dead-center position of the piston.

Still another object of the present invention resides in an apparatus for determining the upper dead-center position in piston internal combustion engines which utilizes a single combined unit adapted to be mounted in an already existing bore of the engine to measure both the distance and pressure.

Figure 2:
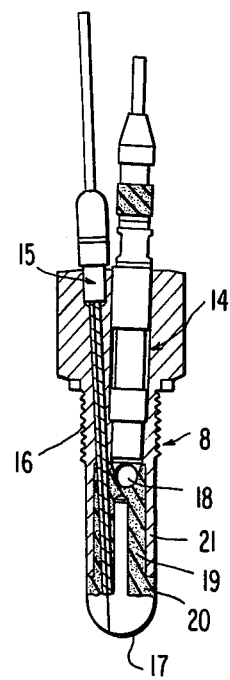

These and other objects, features and advantages of the present invention will become more apparent from the following description when taken in connection with the accompanying drawing which shows, for purposes of illustration only, one embodiment in accordance with the present invention, and wherein:

FIG. 1 is a schematic view showing the construction, in principle, of a measuring installation according to the present invention, while FIG. 2 is a cross-sectional view through an assembly unit including a pressure-measuring transmitter and a distance-measuring transmitter in accordance with the present invention.

Referring now to FIG. 1, reference numeral 1 generally designates therein a schematically illustrated reciprocating piston internal combustion engine whose piston 2 is connected with the crankshaft 4 by way of a connecting rod 3. A combustion space 7 which is changeable in volume by the movement of the piston 2 is delimited by the piston 2, the cylinder 5, and the cylinder head 6. A spark plug bore provided in the cylinder head 6 terminates in the combustion space 7. An assembly or mounting unit 8 including a pressure-measuring transmitter and a distance-measuring transmitter which, in the illustration according to FIG. 1, is screwed into the spark plug bore in lieu of a spark plug. The unit 8 is then connected with a recording or indicating apparatus 9 of any conventional construction which records or indicates the pressure (pressure curve 10) and the distance (distance curve 11), possibly already in relation to the crankshaft angle. The recording or indicating apparatus 9, in its turn, is connected with the unit 8—as schematically illustrated in FIG. 1—and is thereby connected by way of a line 12 with the pressure-measuring transmitter and by way of a line 13 with the distance-measuring transmitter. Preferably a quartz pressure transducer thereby serves as pressure-measuring transmitter, whereby a charge amplifier of conventional construction is connected in the line 12 in the output of the pressure-measuring transmitter. The detection of the distance or spacing takes place preferably by way of a capacitive distance-measuring transmitter, and in the interconnection with the indicating apparatus an oscillator as well as a reactance converter for matching the input and output resistances are connected in line 13 in the output of the distance-measuring transmitter.

As can be seen from FIG. 1, the curves, namely, the pressure curve 10 and the distance curve 11 which are illustrated on the recording or indicating apparatus 9, are displaced with respect to one another, i.e., the pressure maximum—apex of the curve 10—does not occur at the minimum distance of the piston 2 from the cylinder head 6—upper dead-center position of the piston 2 and apex of the curve 11. Consequently, in relation to the rotation of the crankshaft and the corresponding stroke movements of the piston, a leading of the pressure curve 10 with respect to the piston distance (curve 11) results, and more particularly conditioned in that internal engine losses occur which can be traced back to heat transfer and leakage. The magnitude of these losses corresponds to the difference between the apex points of the pressure curve 10 and of the distance curve 11 which, by analogy to the crankshaft angle, is represented as thermodynamic loss angle $\Delta \phi$. The recognition of this thermodynamic loss angle $\Delta \phi$ is now not only of theoretical interest but also of eminent practical significance since it alone enables by means of pressure measurements, for example, the control of the coordination of the customary marking for the upper dead-center position coordinated to the flywheel to the actual upper dead-center position and therewith offers the assurance for accurate ignition instant adjustments. More particularly, if differences exist between the marking for the upper dead-center position and the upper dead-center position, which rarely is the case in practice, then, of course, also the adjustment of the ignition instant to the actual upper dead-center position cannot be assured with the prior art methods, which becomes disadvantageous especially with the modern engines that are relatively sensitive as regards ignition instant or timing adjustment. The construction according to the present invention enables thereby to undertake the accurate determination of the upper dead-center position after knowledge of the thermodynamic loss angle $\Delta \phi$ exclusively on the basis of a pressure measurement which can be carried out in a simple and reliable manner both on the test stand as also during the customer service.

FIG. 2 illustrates the assembly or mounting unit 8 in cross section used in FIG. 1 for the detection of the thermodynamic loss angle, whereby reference numeral 14 generally designates the quartz pressure transducer which is constructed in a conventional manner. Reference numeral 15 generally designates the distance-measuring transmitter, which is also of conventional construction, for capacitively detecting the distance of the piston from the assembly unit 8 screwed securely into the cylinder head. The assembly unit 8 is thereby preferably screwed by way of the thread 16 into a spark plug bore or into an injection nozzle bore so that already existing fastening possibilities which are present in the engine are used. In order to avoid erroneous measurements especially of the distance-measuring transmitter 15, the distance-measuring transmitter 15 and the quartz pressure transducer 14 are arranged at an acute angle to one another whereby the quartz pressure transducer 14 is additionally displaced relatively far toward the rear with respect to the tip or measuring dome 17 of the assembly unit 8. The connection with the combustion space, into which the assembly unit 8 projects for the detection of pressure and distance, thereby takes place for the quartz pressure transducer 14 by way of at least one cross bore 18 which is disposed below the thread 16 and extends transversely to the plane which is subtended by the center lines of the quartz pressure transducer 14 and of the distance-measuring transmitter 15. As a result thereof, a sufficiently large insulating volume remains for the distance-measuring pick-up 15 over its entire length, and especially also within the area of the measuring dome or tip 17 of the assembly unit 8 in order to avoid erroneous measurements with correct handling. In particular, a completely satisfactory insulation of the measuring dome or tip 17 with respect to the base body carrying the screw-in thread 16 can be attained thereby. The insulating body 19 can thereby be constructed as support pin for the measuring dome forming the measuring dome or tip 17 which, with a mushroom-like base form, is anchored by way of its stem centrally within the insulating body and which, within the area of the hood edge, rests on a collar 20 of the support pin which is disposed between the hood edge and the edge of the bush-like accommodation 21 of the base body for the support pin (insulating body 19). The cross bore 18 is located at the upper end of the insulating body.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for determining the upper dead-center position of a piston in piston engines, comprising the steps of determining a crankshaft angle corresponding to a maximum compression pressure by a pressure measurement, and adding a correcting factor that corresponds to a thermodynamic loss angle conditioned by heat transfer and leakage losses.

2. A method according to claim 1, characterized by determining the thermodynamic loss angle $\Delta \phi$ by the addition of the heat transfer loss angle $\Delta \phi_W$ and by the leakage loss angle $\Delta \phi_L$, whereby $$\Delta \phi_W = \frac{\Delta_Q}{p_{max}\left[\frac{C_p}{R}\right]K_1}$$

and $$\Delta \phi_L = \frac{1.924 \cdot \sqrt{T} \cdot A_L}{n_m \cdot K_1}$$

if $\Delta_Q$ is a heat quantity given off by a gas to a combustion space wall per ° crankshaft angle,
$p_{max}$ is a maximum pressure,
$[C_p/R]$ is a combustion value of the gas,
$K_1$ is a volume function,
$T$ is gas temperature in ° K.,
$A_L$ is an effective leakage cross section, and
$n_M$ is engine rotational speed, and if $K_1$ is determined by the following equation:

$$K_1 = 3.05 \cdot 10^4 \cdot V_H \left[\frac{1}{2} + \lambda\right]$$

whereby $V_H$ is a stroke volume of a cylinder of the engine, and
$\lambda$ is a connecting rod ratio.

3. A method according to claim 2, characterized by determining the thermodynamic loss angle $\Delta \phi$ from a measured displacement between pressure maximum and the upper dead-center position of the piston.

4. A method according to claim 3, characterized by determining the piston position in the upper dead-center position by a distance measurement.

5. A method according to claim 4, characterized by determining the pressure maximum by a pressure measurement.

6. A method according to claim 5, characterized by simultaneously carrying out the distance measurement and pressure measurement.

7. A method according to claim 1, characterized by determining the thermodynamic loss angle $\Delta \phi$ from a measured displacement between a pressure maximum and the upper dead-center position of the piston.

8. A method according to claim 1, characterized by determining the piston position in the upper dead-center position by a distance measurement.

9. A method according to claim 8, characterized by determining the pressure maximum by a pressure measurement.

10. A method according to claim 9, characterized in that the distance measurement and pressure measurement are carried out simultaneously.

11. An apparatus for determining an upper dead-center position of a piston in piston engines, in which the crankshaft angle corresponding to a maximum compression pressure is determined by a pressure measurement, characterized in that means are provided detecting a thermodynamic loss angle conditioned by heat transfer and leakage losses including a pressure-measuring transmitter means and a distance-measuring transmitter means combined into a single mounting unit.

12. An apparatus according to claim 11, characterized in that the pressure measuring transmitter means is a quartz pressure transducer.

13. An apparatus according to claim 11, characterized in that the pressure measuring transmitter means is a strain gauge transducer.

14. An apparatus for determining an upper dead center position of pistons in a piston engine, in which the crankshaft angle corresponding to a maximum compression pressure is determined by a pressure measurement and a correcting factor is added that corresponds to the thermodynamic loss angle conditioned by heat-transfer and leakage losses, characterized by a pressure-measuring transmitter means and a distance-measuring transmitter means which are combined into a single mounting unit and in that the distance measuring transmitter means is a capacitive distance-measuring transmitter.

15. An apparatus for determining an upper dead center portion of pistons in a piston engine, in which the crankshaft angle corresponding to a maximum compression pressure is determined by a pressure measurement and a correcting factor is added that corresponds to the thermodynamic loss angle conditioned by heat-transfer and leakage losses, the distance measuring transmitter means is characterized by a pressure measuring transmitter means and a distance-measuring transmitter means which are combined into a single mounting unit and in that the distance measuring transmitter means is an inductive distance-measuring transmitter.

16. An apparatus, for determining an upper dead center portion of pistons in a piston engine, in which the crankshaft angle corresponding to a maximum compression pressure is determined by a pressure measurement and a correcting factor is added that corresponds to the thermodynamic loss angle conditioned by heat-transfer and leakage losses, characterized by a pressure-measuring transmitter means and a distance-measuring transmitter means which are combined into a single mounting unit and in that the distance measuring transmitter means is a capacitive distance-measuring transmitter and in that the single mounting unit includes a screw-in thread, and a pressure-connecting bore adjoining the screw in thread, the pressure connecting bore is coordinated to the pressure-measuring transmitter means and is disposed substantially transversely to an axis of the thread.

17. An apparatus according to claim 16, in which the distance-measuring transmitter means includes a distance-measuring transmitter dome, characterized in that a part located axially between the distance-measuring transmitter dome and the pressure-connecting bore is constructed as insulating body.

18. An apparatus for determining an upper dead-center position of pistons in piston engines, the apparatus comprising means for determining a crankshaft angle corresponding to a maximum compression pressure by a pressure measurement and means for detecting a thermodynamic loss angle conditioned by heat transfer and leakage losses.

19. An apparatus according to claim 18, characterized in that the last-mentioned means detects the thermodynamic loss angle $\Delta \phi$ by an addition of the heat transfer loss angle $\Delta \phi_W$ and by a leakage loss angle $\Delta \phi_L$, whereby $$\Delta \phi_W = \frac{\Delta_Q}{p_{max} \left[ \frac{C_p}{R} \right] K_1}$$

and $$\Delta \phi_L = \frac{1.924 \cdot \sqrt{T} \cdot A_L}{n_m \cdot K_1}$$

if
$\Delta_Q$ is heat quantity given off by a gas to a combustion space wall per ° crankshaft angle,
$p_{max}$ is a maximum pressure,
$[C_p/R]$ is a combustion value of the gas,
$K_1$ is a volume function,
T is a temperature of the gas in ° K.,
$A_L$ is an effective leakage cross section, and
$n_M$ is engine rotational speed,
and if $K_1$ is determined by the following equation:

$$K_1 = 3.05 \cdot 10^4 \cdot V_H \left[ \frac{1}{2} + \lambda \right]$$

whereby
$V_H$ is a stroke volume of a cylinder of the engine, and
$\lambda$ is a connecting rod ratio.

* * * * *

Disclaimer 4,147,054.—*Gunter Hohenberg*, Hohengehren; and *Detlef Kurr*, Waiblingen, Germany, METHOD AND APPARATUS FOR DETERMINING THE UPPER DEAD-CENTER POSITION WITH PISTON ENGINES. Patent dated Apr. 3, 1979. Disclaimer filed Apr. 7, 1981, by the assignee, *Daimler-Benz Aktiengesellschaft.*

Hereby enters this disclaimer to claims 1–19 of said patent.

[*Official Gazette June 9, 1981.*]